(No Model.)
W. R. PATTERSON.
ELECTRIC CABLE.
No. 592,441. Patented Oct. 26, 1897.
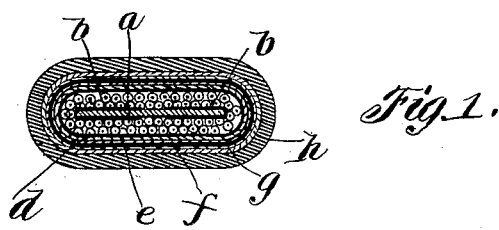
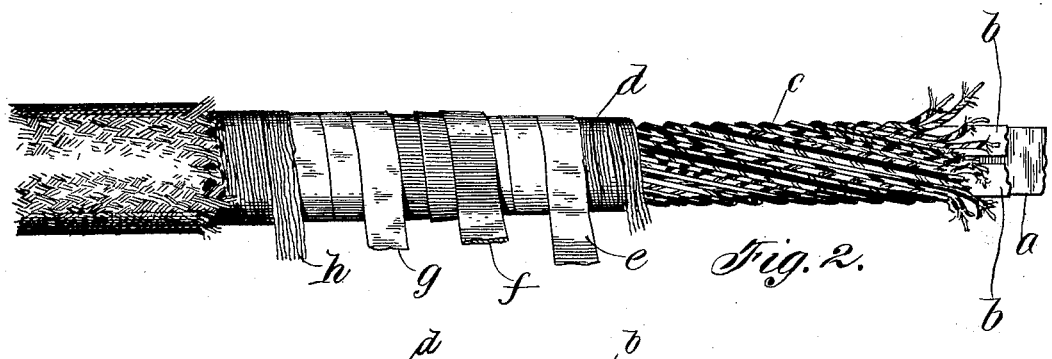
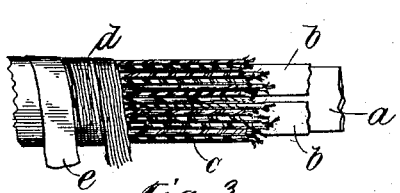
Witnesses:
D. H. C. Banner
George R. Cragg
Inventor:
William R. Patterson,
By Barton Brown
Attorneys.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

ELECTRIC CABLE.

SPECIFICATION forming part of Letters Patent No. 592,441, dated October 26, 1897.

Application filed August 20, 1896. Serial No. 603,323. (No model.)

*To all whom it may concern:*

Be it known that I, WILLIAM R. PATTERSON, a citizen of the United States, residing at Chicago, in the county of Cook and State of Illinois, have invented a certain new and useful Improvement in Electric Cables, (Case No. 104,) of which the following is a full, clear, concise, and exact description, reference being had to the accompanying drawings, forming a part of this specification.

My invention relates to electric cables of the kind usually employed for making the connections between the sections of multiple switchboards. It is necessary to lay up the switches in narrow horizontal strips in order that they may be brought within reasonable reaching distance. The cables carrying the wires are placed back of the switchboards and are run horizontally, following the line of the spring-jack switches with which they are connected. This arrangement is shown in Letters Patent No. 503,555, granted Charles Ezra Scribner August 15, 1893, for a coupling system for multiple switchboards. It will be understood that the cables must not be thicker than the strips of spring-jack switches, and in order that space may be made for wires of sufficient conductivity and with insulation of sufficient thickness to give the required capacity the cables have been made flat or oval. There is a serious objection to such flat or oval cables as they have been heretofore built up, from the fact that by the frequent handling, which is necessary, they become compressed edgewise, causing them to approximate toward the cylindrical form, thereby increasing their thickness beyond that of the strips of jacks. It is evident that if the cables are made or become thicker than the strips of jacks to which they are connected that a short distance above the bottom layer of cables the cable will not be opposite its strip of spring-jacks, but some distance above, so that the removal of a strip of jacks at the rear through the mass of cables would be prevented. Recognizing this fact, the cables in the first instance have been made somewhat thinner than the strips of jacks to provide for the increase in thickness due to handling, and the limit to which the thickness of the strips of jacks could be reduced has been determined by the requirements of space for the cables. To obtain the required reduction in thickness, an attempt has been heretofore made to form the wires, which connect with the strips of spring-jack switches, into a web. Such a web, however, has not found favor, particularly on account of the lack of protection to the wires and the liability to fire where the fibrous webbing is freely exposed to the air.

The principal feature of my invention herein consists in a construction of a flat cable in such manner that it will keep its form, though subjected to frequent handling. For this purpose I lay the wires about a ribbon, which may be formed of any desired material having sufficient rigidity to prevent the displacement of the cable edgewise and sufficient flexibility to allow the cable to be coiled and handled. The ribbon which I have found most suitable for the purpose and which I will describe consists of copper having the sharp edges thereof protected by paper. The wires are laid up spirally about this central ribbon and insulated and protected in any well-known way. Instead of being wound spirally they may be laid parallel on one or both sides of the ribbon.

My invention will be more readily understood by reference to the accompanying drawings, in which—

Figure 1 is an enlarged sectional view of a cable embodying my invention. Fig. 2 is a side elevation illustrating the manner of wrapping the wires spirally about the ribbon and the positions occupied by the various protecting coverings. Fig. 3 illustrates the wires laid parallel with the ribbon and bound thereto.

Like parts are indicated by similar letters of reference in the different figures.

As shown in Figs. 1 and 2, the copper ribbon $a$, it will be seen, is at the center of the cable. The edges thereof are covered by paper $b\,b$. The insulated conductors $c$, in this instance consisting of two layers, are laid spirally about the core and held by the serving $d$, which may be of cotton yarn. Next there is wound on a covering of paper $e$ and over this a covering of lead tape $f$, over which is placed a second layer of paper tape $g$. Next we have a serving of yarn $h$, and finally a braided covering, which covering should be saturated with fireproof paint.

In Fig. 3 the copper ribbon $a$ is the same as shown in Figs. 1 and 2. The insulated conductors $c$, however, are placed parallel to the ribbon and bound thereto by suitable serving.

Where I have used a ribbon of papier-mâché, I have found it convenient to glue the wires to the ribbon, in which case the serving shown in Fig. 3 may be omitted.

It will be understood that in either case the work is performed by machinery in a continuous operation.

By this construction it will be seen that the wires are thoroughly insulated and protected from moisture, while the cable as a whole may be considered fireproof.

While I prefer a copper ribbon of the form shown, having the edges thereof protected by paper to prevent cutting the insulation of the wires, such mechanical injury to the insulation may be prevented by folding the edges of the ribbon or by forming them in any way so that they may not be liable to cut the insulation. I have found paper, however, on the whole the cheapest and most satisfactory protection. The ribbon, being metal, may be utilized as a conductor when desired. I have made samples in which a stiff paper ribbon instead of a metallic ribbon was employed, and have also used ribbons of lead and solder. Ribbon of soft iron or steel might be successfully employed. Phosphor-bronze and other compounds of copper might be employed; also zinc and aluminium. I therefore do not wish to limit my patent to the use of copper as a material for the ribbon, though, as before stated, I consider it the best.

Having thus described my invention, I claim as new and desire to secure by Letters Patent—

1. A flat cable, consisting of insulated wires wound spirally about a central metallic ribbon; said metallic ribbon having substantially the rigidity and flexibility of copper.

2. An electric cable having the insulated wires thereof wound about a central, metallic ribbon, the edges of said ribbon being covered with paper; substantially as and for the purpose described.

3. A flat, electric cable, consisting of insulated wires wound about a central copper ribbon, the wires being bound together by a serving, over which are wound in the order following, paper, lead tape, paper and a serving; said ribbon being adapted to be used as a conductor, while preventing the cable from being compressed edgewise; substantially as and for the purpose specified.

4. The combination in an electric cable, of a flat ribbon rigid transversely, insulated wires laid upon the said ribbon, and a suitable binding about the ribbon and wires, substantially as described.

5. The combination in a flat cable, of insulated wires, a flat transversely-rigid ribbon, and a serving binding the wires to the ribbon, substantially as described.

In witness whereof I hereunto subscribe my name this 28th day of January, A. D. 1896.

WILLIAM R. PATTERSON.

Witnesses:
GEORGE P. BARTON,
JOHN W. SINCLAIR.